(12) United States Patent
Gray et al.

(10) Patent No.: US 11,782,569 B2
(45) Date of Patent: Oct. 10, 2023

(54) CONTEXTUAL TRIGGERING OF ASSISTIVE FUNCTIONS

(71) Applicant: Google LLC, Mountain View, CA (US)

(72) Inventors: Kristin A. Gray, San Mateo, CA (US); Tim Wantland, Pacifica, CA (US); Matthew Stokes, Hancock, NH (US); Bingying Xia, Mountain View, CA (US); Karen Vertierra, Mountain View, CA (US); Melissa Barnhart, Pacifica, CA (US); Gus Winkleman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/443,352

(22) Filed: Jul. 26, 2021

(65) Prior Publication Data
US 2023/0026521 A1    Jan. 26, 2023

(51) Int. Cl.
| | |
|---|---|
| G06F 3/0482 | (2013.01) |
| G06F 3/04812 | (2022.01) |
| H04W 4/38 | (2018.01) |
| H04W 4/029 | (2018.01) |
| G06F 3/04847 | (2022.01) |
| G06F 3/0488 | (2022.01) |
| G06F 3/16 | (2006.01) |

(52) U.S. Cl.
CPC ........ *G06F 3/04812* (2013.01); *G06F 3/0482* (2013.01); *G06F 3/0488* (2013.01); *G06F 3/04847* (2013.01); *G06F 3/167* (2013.01); *H04W 4/029* (2018.02); *H04W 4/38* (2018.02)

(58) Field of Classification Search
None
See application file for complete search history.

(56) References Cited

U.S. PATENT DOCUMENTS

| | | | | |
|---|---|---|---|---|
| 9,846,999 | B1* | 12/2017 | Pickover | H04M 1/72403 |
| 10,503,733 | B2* | 12/2019 | Bakir | G06F 16/9535 |
| 2012/0215543 | A1 | 8/2012 | Oz et al. | |
| 2013/0235073 | A1* | 9/2013 | Jaramillo | G09G 5/00 345/619 |

(Continued)

OTHER PUBLICATIONS

P. Milhorat, S. Schlögl, G. Chollet, J. Boudy, A. Esposito and G. Pelosi, ("Building the next generation of personal digital Assistants," 2014 1st International Conference on Advanced Technologies for Signal and Image Processing (ATSIP), 2014, pp. 458-463, doi: 10.1109/ATSIP.2014.6834655.) (Year: 2014).*

(Continued)

*Primary Examiner* — William L Bashore
*Assistant Examiner* — Gabriel Mercado
(74) *Attorney, Agent, or Firm* — Honigman LLP; Brett A. Krueger; Grant J. Griffith

(57) ABSTRACT

A method includes, while a user device is using a first presentation mode to present content to a user, obtaining a current state of the user of the user device. The method also includes, based on the current state of the user, providing, as output from a user interface of the user device, a user-selectable option that when selected causes the user device to use a second presentation mode to present the content to the user. The method further includes, in response to receiving a user input indication indicating selection of the user-selectable option, initiating presentation of the content using the second presentation mode.

22 Claims, 10 Drawing Sheets

(56) References Cited

U.S. PATENT DOCUMENTS

| | | | |
|---|---|---|---|
| 2015/0162000 A1* | 6/2015 | Di Censo | G10L 15/22 |
| | | | 704/270.1 |
| 2016/0085430 A1* | 3/2016 | Moran | H04M 1/72454 |
| | | | 715/765 |
| 2016/0253083 A1* | 9/2016 | Lee | H04M 1/27475 |
| | | | 715/771 |
| 2016/0350136 A1* | 12/2016 | Karlo | G06F 9/453 |
| 2017/0289766 A1* | 10/2017 | Scott | H04W 4/023 |
| 2017/0344209 A1 | 11/2017 | Gordon et al. | |
| 2018/0107930 A1* | 4/2018 | Aggarwal | G06Q 10/10 |
| 2018/0190264 A1* | 7/2018 | Mixter | G06F 3/167 |
| 2018/0322380 A1* | 11/2018 | Aggarwal | G06N 3/006 |
| 2018/0336045 A1* | 11/2018 | Badr | G06N 3/006 |
| 2018/0358012 A1 | 12/2018 | Van Den Berg et al. | |
| 2019/0087205 A1 | 3/2019 | Guday | |
| 2022/0289229 A1* | 9/2022 | Mitsui | B60K 35/00 |

OTHER PUBLICATIONS

Kavafian, Hagop et al.—Assistant's context-aware recommendations are live for some in Messages 4.4, <https://www.androidpolice.com/2019/05/21/assistants-context-aware-recommendations-are-live-in-messages-4-4-apk-downloads/>, May 21, 2019.

International Search Report and Written Opinion for the related Application No. PCT/US2022/036170 dated Oct. 18, 2022, 68 pages.

\* cited by examiner

CONTEXTUAL TRIGGERING OF ASSISTIVE FUNCTIONS

TECHNICAL FIELD

This disclosure relates to the contextual triggering of assistive functions.

BACKGROUND

Users frequently interact with computing devices, such as smart phones, smart watches, and smart speakers, through digital assistant interfaces. These digital assistant interfaces enable users to consume media content on a variety of applications accessible to the computing device. When a user of a computing device consumes media content, the media content often occupies some aspect of the user's senses. For instance, when a user is reading a news article, the act of reading a news article occupies the user's sense of sight. Consequently, with a computing device occupying a user's sense of sight, a user may not be visually aware of other activities occurring around the user. This may be problematic in situations when activities around the user require a visual awareness to, for example, prevent potential harm to the user and/or computing device. For example, if the user is walking and reading a news article, the user may not be aware of an oncoming collision with another person approaching the user. As assistant interfaces become more integrated with these various applications and operating systems running on computing devices, digital assistants may be leveraged to influence how media content is presented to a user of a computing device to aid in the awareness of the user.

SUMMARY

One aspect of the present disclosure provides a computer-implemented method when executed on data processing hardware of a user device causes the data processing hardware to perform operations for triggering assistance functions on the user device that include, while the user device is using a first presentation mode to present content to a user of the user device, obtaining a current state of the user on the user device. The operations also include, based on the current state of the user, providing, as output from a user interface of the user device, a user-selectable option that when selected causes the user device to use a second presentation mode to present the content to the user. The operations further include, in response to receiving a user input indication indicating selection of the user-selectable option, initiating presentation of the content using the second presentation mode.

Implementations of the disclosure may include one or more of the following optional features. In some implementations, the operations further include receiving sensor data captured by the user device, where obtaining the current state of the user is based on the sensor data. In these implementations, the sensor data may include at least one of global positioning data, image data, noise data, accelerometer data, connection data indicating the user device is connected to another device, or noise/speech data.

In some examples, the current state of the user is indicative of one or more current activities the user is performing. Here, the current activity of the user may include at least one of walking, driving, commuting, talking, or reading. In some implementations, providing the user-selectable option as output from the user interface is further based on a current location of the user device. Additionally, or alternatively, providing the user-selectable option as output from the user interface is based on a type of the content and/or a software application running on the user device that is providing the content.

In some examples, the first presentation mode includes one of a visual-based presentation mode or an audio-based presentation mode, and the second presentation model includes the other one of the visual-based presentation mode or the audio-based presentation mode. In some implementations, the operations further include, after initiating presentation of the content using the second presentation mode, presenting the content using the second presentation mode while ceasing presentation of the content using the first presentation mode. Alternatively, the operations further include, after initiating presentation of the content using the second presentation mode, presenting the content using both the first presentation mode and the second presentation mode in parallel.

In some implementations, providing the user-selectable option as output from the user interface includes displaying, via the user interface, the user-selectable option as graphical element on a screen of the user device. Here, the graphical element informs the user that the second presentation mode is available for presenting the content. In these implementations, receiving the user input indication includes receiving one of a touch input on the screen that selects the displayed graphical element, receiving a stylus input on the screen that selects the displayed graphical element, receiving a gesture input indicating selection of the displayed graphical element, receiving a gaze input indicating selection of the displayed graphical element, or receiving a speech input indicating selection of the displayed graphical element.

In some examples, providing the user-selectable option as output from the user interface includes providing, via the user interface, the user-selectable option as an audible output from a speaker in communication with the user device. Here, the audible output informs the user that the second presentation mode is available for presenting the content. In some implementations, receiving the user input indication indicating selection of the user-selectable option includes receiving a speech input from the user indicating a user command to select the user-selectable option. In these implementations, the operations may further include, in response to providing the user-selectable option as output from the user interface, activating a microphone to capture the speech input from the user.

Another aspect of the present disclosure provides a system for triggering assistance functions on a user device. The system includes data processing hardware and memory hardware in communication with the data processing hardware. The memory hardware stores instructions that when executed on the data processing hardware cause the data processing hardware to perform operations. The operations include while the user device is using a first presentation mode to present content to a user of the user device, obtaining a current state of the user of the user device. The operations also include, based on the current state of the user, providing, as output from a user interface of the user device, a user-selectable option that when selected causes the user device to use a second presentation mode to present the content to the user. The operations further include, in response to receiving a user input indication indicating selection of the user-selectable option, initiating presentation of the content using the second presentation mode.

This aspect may include one or more of the following optional features. In some implementations, the operations further include receiving sensor data captured by the user device, where obtaining the current state of the user is based on the sensor data. In these implementations, the sensor data may include at least one of global positioning data, image data, noise data, accelerometer data, connection data indicating the user device is connected to another device, or noise/speech data.

In some examples, the current state of the user is indicative of one or more current activities the user is performing. Here, the current activity of the user may include at least one of walking, driving, commuting, talking, or reading. In some implementations, providing the user-selectable option as output from the user interface is further based on a current location of the user device. Additionally, or alternatively, providing the user-selectable option as output from the user interface is based on a type of the content and/or a software application running on the user device that is providing the content.

In some examples, the first presentation mode includes one of a visual-based presentation mode or an audio-based presentation mode, and the second presentation model includes the other one of the visual-based presentation mode or the audio-based presentation mode. In some implementations, the operations further include, after initiating presentation of the content using the second presentation mode, presenting the content using the second presentation mode while ceasing presentation of the content using the first presentation mode. Alternatively, the operations further include, after initiating presentation of the content using the second presentation mode, presenting the content using both the first presentation mode and the second presentation mode in parallel.

In some implementations, providing the user-selectable option as output from the user interface includes displaying, via the user interface, the user-selectable option as graphical element on a screen of the user device. Here, the graphical element informs the user that the second presentation mode is available for presenting the content. In these implementations, receiving the user input indication includes receiving one of a touch input on the screen that selects the displayed graphical element, receiving a stylus input on the screen that selects the displayed graphical element, receiving a gesture input indicating selection of the displayed graphical element, receiving a gaze input indicating selection of the displayed graphical element, or receiving a speech input indicating selection of the displayed graphical element.

In some examples, providing the user-selectable option as output from the user interface includes providing, via the user interface, the user-selectable option as an audible output from a speaker in communication with the user device. Here, the audible output informs the user that the second presentation mode is available for presenting the content. In some implementations, receiving the user input indication indicating selection of the user-selectable option includes receiving a speech input from the user indicating a user command to select the user-selectable option. In these implementations, the operations may further include, in response to providing the user-selectable option as output from the user interface, activating a microphone to capture the speech input from the user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
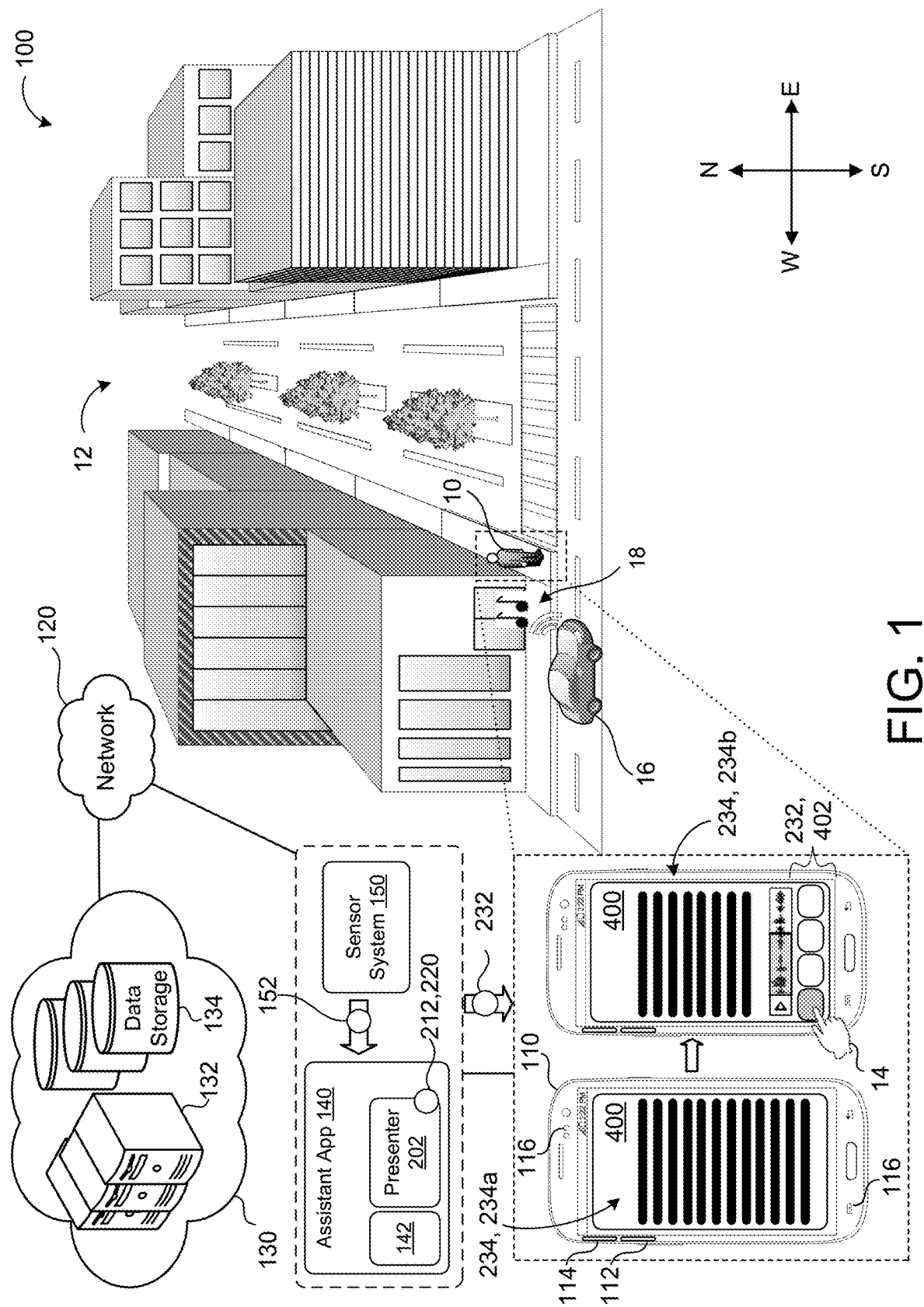
FIG. 1 is a schematic view of an example environment including a user using a contextual triggering assistance function.

FIG. 1 is an example system 100 for triggering assistance functions based on a current state of a user 10 while using a user device 110. Briefly, and as described in more detail below, while the user 10 is using the user device 110 in a first presentation mode 234, 234a, an assistant application 140 executing on the user device 110 obtains a current state 212 (FIG. 2) of the user 10. Based on the current state 212 of the user 10, the assistant application 140 provides a selection of presentation mode options 232 which, when selected, initiates the presentation of a second presentation mode 234, 234b on the user device 110.

The system 100 includes the user device 110 executing the assistant application 140 that the user 10 may interact with. Here, the user device 110 corresponds to a smart phone. However, the user device 110 can be any computing device, such as, without limitation, a tablet, smart display, desk/laptop, smart watch, smart appliance, smart speaker, headphones, or vehicle infotainment device. The user device 110 includes data processing hardware 112 and memory hardware 114 storing instructions that when executed on the data processing hardware 112 causes the data processing hardware 112 to perform one or more operations (e.g., related to contextual assistive functions). The user device 110 includes an array of one or more microphones 116 configured to capture acoustic sounds such as speech directed toward the user device 110 or other audible noise(s). The user device 110 may also include, or be in communication with, an audio output device (e.g., speaker) 118 that may output audio such as notifications 404 and/or synthesized speech (e.g., from the assistant application 140). The user device 110 may include an automated speech recognition (ASR) system 142 including an audio subsystem configured to receive a speech input from the user 10 via the one or more microphones 116 of the user device 110 and process the speech input (e.g., to perform various speech-related functionality).

The user device 110 may be configured to communicate via a network 120 with a remote system 130. The remote system 130 may include remote resources, such as remote data processing hardware 132 (e.g., remote servers or CPUs) and/or remote memory hardware 134 (e.g., remote databases or other storage hardware). In some examples, some functionality of the assistant application 140 resides locally or on device while other functionality resides remotely. In other words, any of the functionality of the assistant application 140 may be local or remote in any combination. For instance, when the assistant application 140 performs automatic speech recognition (ASR), which includes large processing requirements, the remote system 130 may perform the processing. Yet, when the user device 110 may support the processing requirements, for instance, when the user device 110 is performing hotword detection or operating end-to-end ASR (e.g., with device-supported processing requirements), the data processing hardware 112 and/or memory hardware 114 may perform the processing. Optionally, the assistant application 140 functionality may reside both locally/on-device and remotely (e.g., as a hybrid of locally and remotely).

The user device 110 includes a sensor system 150 configured to capture sensor data 152 within the environment of the user device 110. The user device 110 may continuously, or at least during periodic intervals, receive the sensor data 152 captured by the sensor system 150 to determine the current state 212 of the user 10 of the user device 110. Some examples of sensor data 152 include global positioning data, motion data, image data, connection data, noise data, speech data, or other data indicative of a state of the user device 110 or state of the environment in the vicinity of the user device 110. With global positioning data, system(s) associated with the user device 110 may detect a location and/or directionality of the user 10. Motion data may include accelerometer data that characterizes movement of the user 10 via movement of the user device 110. Image data may be used to detect features of the user 10 (e.g., a gesture by the user 10 or facial features to characterize a gaze of the user 10) and/or features of the environment of the user 10. Connection data may be used to determine whether the user device 110 is connected with other electronics or devices (e.g., docked with a vehicle infotainment system or headphones). Acoustic data, such as noise data or speech data, may be captured by the sensor system 150 and used to determine the environment of the user device 110 (e.g., characteristics or properties of the environment that have particular acoustic signatures) or identify whether the user 10 or another party is speaking. In some implementations, the sensor data 152 includes wireless communication signals (i.e., signal data), such as Bluetooth or Ultrasonic, which represent other computing devices (e.g., other user devices) in proximity to the user device 110.

In some implementations, the user device 110 executes the assistant application 140 implementing a state determiner process 200 (FIG. 2) and a presenter 202, which manages which presentation mode options 232 are made available (i.e., presented) to the user 110. That is, the assistant application 140 determines the current state 212 of the user 10 and controls which presentation mode(s) 234 are available as options 232 to the user 10 based on the current state 212 of the user 10. In this sense, the assistant application 140 (e.g., via a graphical user interface (GUI) 400) is configured to present content (e.g., audio/visual content) on the user device 110 in different formats referred to as presentation modes 234. Moreover, the assistant application 140 may facilitate which presentation modes 234 are available at particular times depending on the content being conveyed and/or a perceived current state 212 of the user 10. Advantageously, the assistant application 140 allows the user 10 to select a presentation mode 234 from the presentation mode options 232 using an interface 400, such as a graphical user interface (GUI) 400. As used herein, the GUI 400 may receive user input indications via any one or of touch, speech, gesture, gaze, and/or an input device (e.g., mouse or stylus) for interacting with the assistant application 140.

The assistant application 140 executing on the user device 110 may render, for display on the GUI 400, the presentation mode options 232 that the user 10 may select for presenting content on the user device 110. The presentation mode options 232 rendered on the GUI 400 may include, for each presentation mode 234, a respective graphic 402 (FIGS. 4A-4C) identifying the presentation mode 234 available for the current state 212 of the user 10. In other words, by displaying the graphical element 402 for each presentation mode option 232 on the GUI 400, the assistant application 140 may inform the user 10 which presentation mode options 232 are available for presenting the content. For example, when the current state 212 of the user 10 is driving (i.e., a visually-engaging activity), the presentation mode options 232 rendered for display on the GUI 400 may include a graphical element 402 for an audio-based presentation mode 234 that enables the user 10 of the user device 110 to listen to the content using a speaker 118 (e.g., headphones, vehicle infotainment, etc.) connected to the user device 110. On the other hand, when the current state 212 of the user 10 is commuting (e.g., walking or using public transportation), the presentation mode options 232 rendered for display on the GUI 400 may include graphics 402 for a visual-based presentation mode 234a or an audio-based presentation mode 234b.

In the example of FIG. 1, the user 10 is walking in an urban environment 12 while using the user device 110 in a visual-based presentation mode 234a. For instance, the visual-based presentation mode 234a may correspond to the user 10 reading a news article displayed on the GUI 400 of the user device 110 (e.g., reading from a web browser or news-specific application). In this example, a vehicle 16 drives past the user 10 and honks 18 its horn. In the urban environment 12, it may be advantageous for the user 10 to be more alert rather than looking at the user device 110. Accordingly, an audio-based presentation mode 234 may allow the user 10 to pay closer attention to aspects of the urban environment 12 while walking.

While the user device 110 is in the visual-based presentation mode 234a, the sensor system 150 of the user device 110 detects the noise from the vehicle 16 (e.g., the sound of its honk 18) as sensor data 152. The sensor data 152 may further include geo-coordinate data indicating the geographic location of the user 10. The sensor data 152 is input to the assistant application 140 including a presenter 202, which determines a current state 212 of the user 10. Because sensor data 152 indicates that the environment 12 is noisy in the vicinity of the user device 110 and/or indicates that the user 10 is presently located in a congested urban area proximate an intersection, the presenter 202 may determine that the user 10 may wish to switch from the visual-based presentation mode 234a to an audio-based presentation mode 234b to enable the user 10 to have visual awareness of his/her surroundings. Accordingly, the presenter 202 provides the audio-based presentation mode 234b as a presentation mode option 232 to the user 10 (e.g., in addition to other presentation modes 234 such as the visual-based presentation mode 234a) as a graphical element 402 selectable by the user 10. The presentation mode option 232 and corresponding graphical element 402 may be rendered on the GUI 400 in a non-obtrusive manner as a "peek" to inform the user that another presentation mode 234 may be a more suitable option for the user 10 based on the current state 212. The user 10 then provides a user input indication 14 indicating a selection of the option 232 representing the audio based-presentation mode 234b. For example, the user input indication 14 indicating a selection may cause the user device 110 to switch to the audio-based presentation mode 234b such that the assistant application 140 dictates the news article (i.e., outputting synthetic playback audio).

Figure 2:
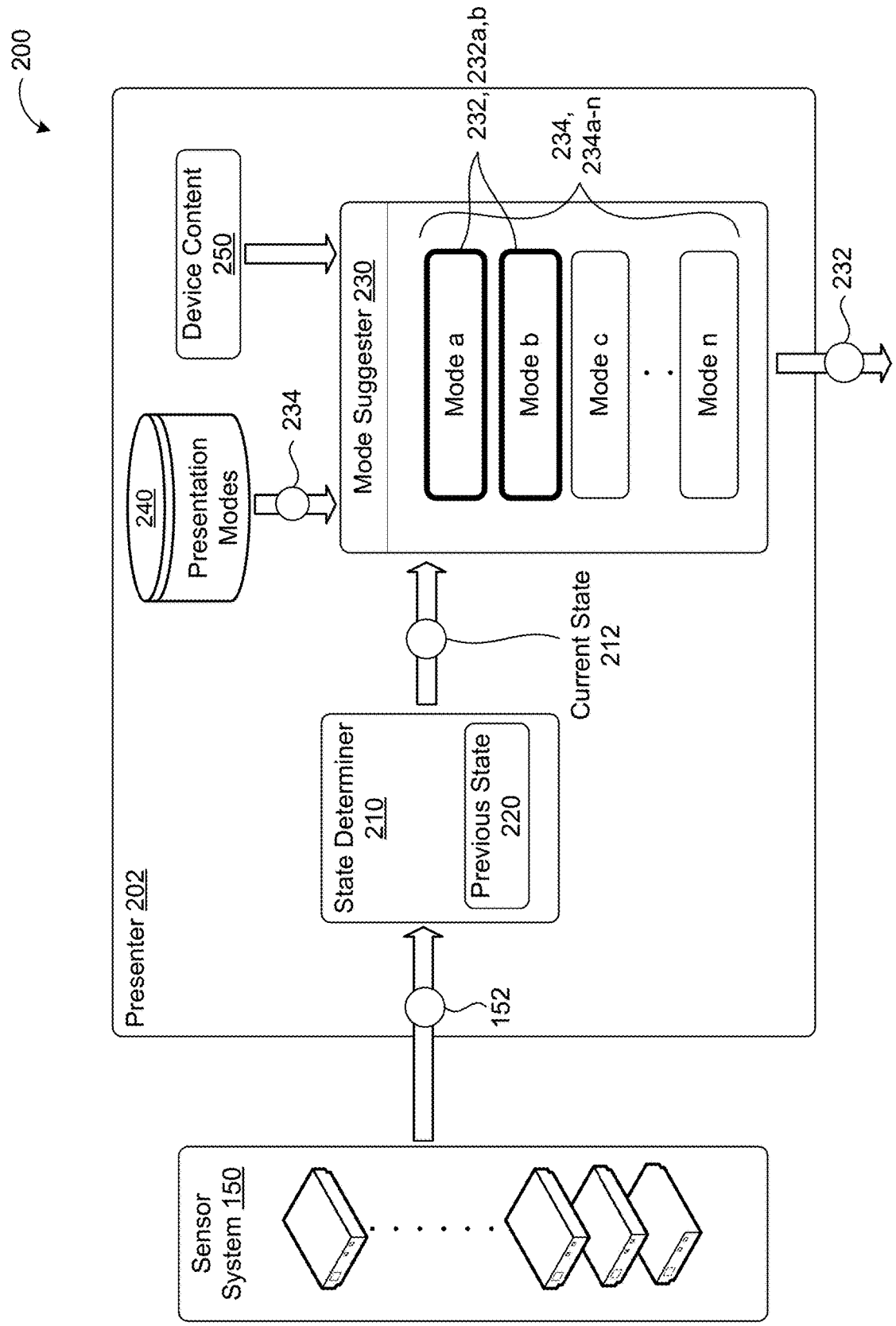
FIG. 2 is a schematic view of an example contextual triggering assistance process.

Referring to FIG. 2 depicting an example state determiner process 200, the presenter 202 may include a state determiner 210 and a mode suggestor 230. The state determiner 210 may be configured to identify a current state 212 of the user 10 based on the sensor data 152 collected by the sensor system 150. In other words, the presenter 202 uses sensor data 152 to derive/ascertain the current state 212 of the user 10. For instance, current sensor data 152 (or the most recent sensor data 152) is representative of the current state 212 of the user 10. With the current state 212, the mode suggestor 230 may select a corresponding set of one or more presentation mode options 232, 232a—n for presenting content on the user device 110. In some examples, the mode suggestor 230 accesses a data store 240 storing all presentation modes 234, 234a—n that the user device 110 is equipped to present to the user 10 as presentation mode options 232. In some examples, the presentation modes 234 are associated with or dependent upon an application hosting the content being displayed on the user device 110 of the user 10. For instance, a news application may have a reading mode with a set or customizable text size and audio mode where text from an article is read aloud as synthesized speech (i.e., output from speakers associated with the user device 110). Accordingly, the current state 212 may also indicate a current application hosting the content presented to the user 10.

In some implementations, the state determiner 210 maintains a record of a previous state 220 of the user 10. Here, a previous state 220 may refer to a state of the user 10 that is characterized by sensor data 152 that is not the most recent (i.e., most current) sensor data 152 from the sensor system 150. For example, the previous state 220 of the user 10 may be walking in an environment with no appreciable distractions to the user 10. In this example, after receiving the sensor data 152, the state determiner 210 may determine that the current state 212 of the user 10 is walking in a noisy and/or busy environment (i.e., the urban environment 12). This change between the previous state 220 and the current state 212 of the user 10 triggers the mode suggestor 230 to provide presentation mode options 232 to the user 10. If, however, the state determiner 210 determines that the previous state 220 and the current state 212 are the same, the state determiner 210 may not send the current state 212 to the mode suggestor 230, and the presenter does not present any presentation mode options 232 to the user 10.

In some examples, the state determiner 210 only outputs the current state 212 to the mode suggestor 230 (thereby triggering the mode suggestor 230) when there is a difference (e.g., difference in sensor data 152) detected between the previous state 220 and the current state 212. For instance, the state determiner 210 may be configured with a state change threshold and, when the difference detected between the previous state 220 and the current state 212 satisfies the state change threshold (e.g., exceeds the threshold), the state determiner 210 outputs the current state 212 to the mode suggestor 230. The threshold may be zero, where the slightest difference between the previous state 220 and the current state 212 detected by the state determiner 210 may trigger the mode suggestor 230 of the presenter 202 to provide presentation mode options 232 to the user 10. Conversely, the threshold may be higher than zero to prevent unnecessary triggering of the mode suggestor 230 as a type of user-interruption sensitivity mechanism.

The current state 212 of the user 10 may be indicative of one or more current activities the user 10 is performing. For example, the current activity of the user 10 may include at least one of walking, driving, commuting, talking, or reading. Additionally, the current state 212 may characterize an environment that the user 10 is in, such as a noisy/busy environment or a quiet/remote environment. Further, the current state 212 of the user 10 may include a current location of the user device 110. For instance, the sensor data 152 includes global positioning data that defines the current location of the user device 110. To illustrate, the user 10 may be near a hazardous location such as an intersection or a train track crossing and a change in presentation mode 234 may be advantageous to the sensory perception awareness of the user 10 at or near the current location. In other words, the inclusion of the current location as part of the current state 212 may be relevant for the presenter 202 to decide when to present options 232 to the user 10 and/or which options 232 to present. Moreover, the current state 212 indicating that the user 10 is also reading content rendered for display on the GUI 400 in the visual-based presentation mode 234a, may provide additional confidence that the need for sensory perception awareness of the user 10 is critical, and thus, presenting a presentation option 232 for switching to the audio-based presentation mode 234a (if available) is warranted.

The mode suggestor 230 receives, as input, the current state 212 of the user 10, and may the select presentation mode options 232 associated with the current state 212 from a list of available presentation modes 234 (e.g., from the presentation modes data store 240). In these examples, the mode suggestor 230 may discard the presentation modes 234 that are not associated with the current state 212 of the user. In some examples, the mode suggestor 230 only retrieves presentation modes 234 from the presentation modes data store 240 that are associated with the current state 212. For example, when the current state 212 of the user 10 is talking, the presentation modes 234 associated with the current state 212 may exclude audio-based presentation modes 234. When the current state 212 of the user 10 is driving, the presentation modes 234 associated with the current state 212 may exclude video-based presentation modes 234. In other words, each current state 212 of the user 10 is associated with one or more presentation modes 234 from which the mode suggestor 230 makes its determination.

The current state 212 can also convey auxiliary components connected to the user device 110. For instance, in the example above where the user is walking in a congested urban environment 12 while actively reading a news article presented by the GUI 400 via the visual-based presentation mode 234a, the current state 212 further indicating that headphones are paired with the user device 110 may provide the mode suggestor 230 with additional confidence to determine the need to present the presentation mode option 232 to switch to the audio-based presentation mode 234b such that the news article is dictated as synthesized speech for audible output through the headphones. In other examples, while presenting content in the visual-based presentation mode 234a, the current state 212 may further convey that the orientation and proximity of the user device 110 relative to the face of the user 10 is extremely close to indicate that the user 10 is having difficulty reading the content. Here, the mode suggestor 230 could present a presentation mode option 232 to increase a text size of the content presented in the visual-based presentation mode 232a in addition to, or in lieu of, a presentation mode option 232 for presenting the content in the audio-based presentation mode 234b.

In some implementations, the mode suggestor 230 determines the presentation mode options 232 to output to the user 10 by considering the content 250 currently being presented on the user device 110. For instance, the content 250 may indicate that the user 10 is currently using a web browser with the capability to dictate a news article that the user 10 is reading. Accordingly, the mode suggestor 230 includes an audio-based presentation mode 234 in the presentation mode options 232 provided to the user 10. Additionally, or alternatively, the content 250 may indicate that the user 10 is currently using an application with closed-caption capabilities, as well as video capabilities, but not dictation capabilities. In these examples, the mode suggestor 230 includes the video-based presentation mode 234 and a closed-caption presentation mode 234, but excludes (i.e., discards/disregards) the audio-based presentation mode 234 from the presentation mode options 232 provided to the user 10.

Figure 3A:
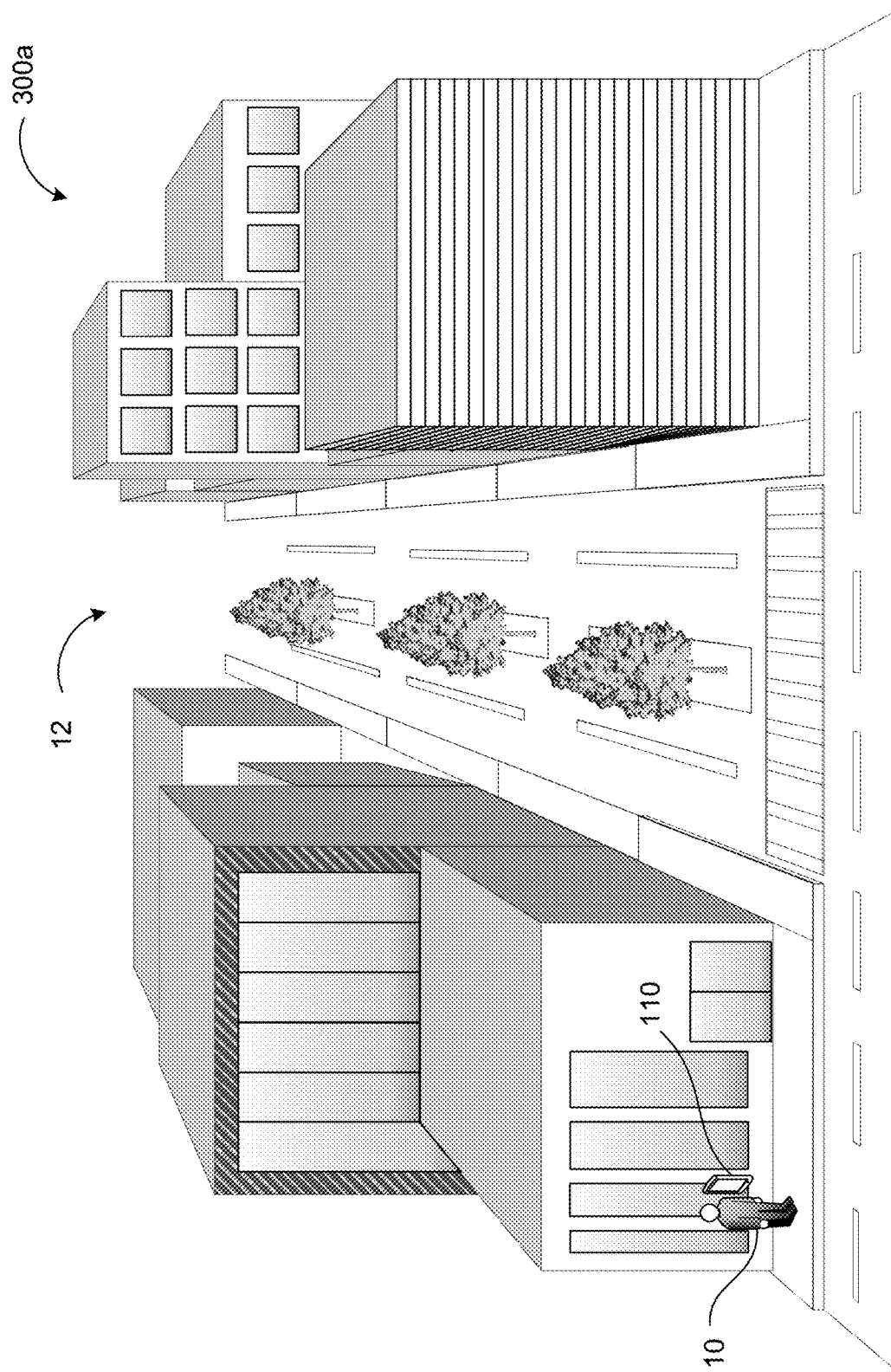
FIGS. 3A-3C are schematic views 300a—c of an example user device enabled with a contextual triggering assistance function in an environment of the user device.
Figure 3B:
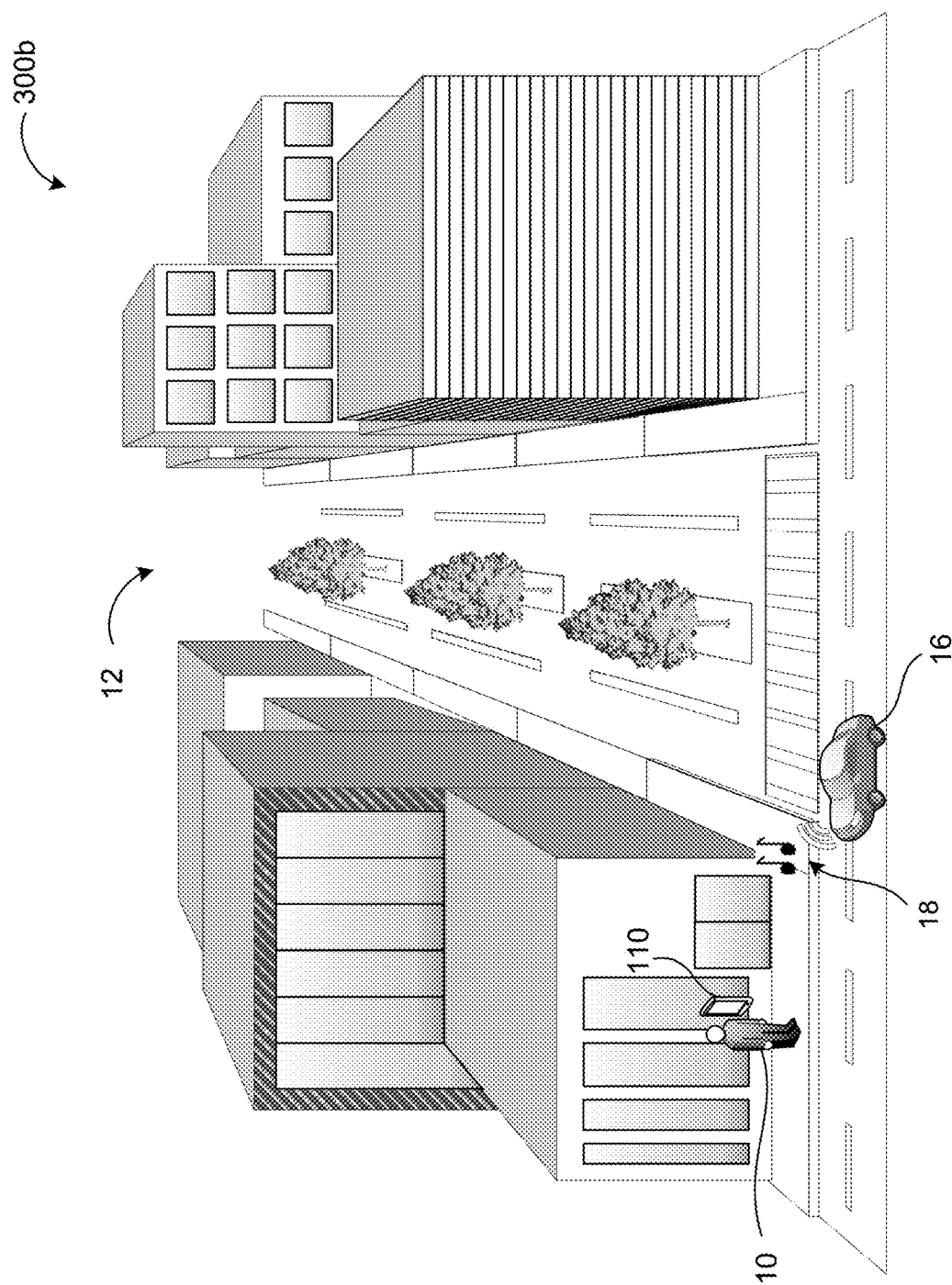
Figure 3C:
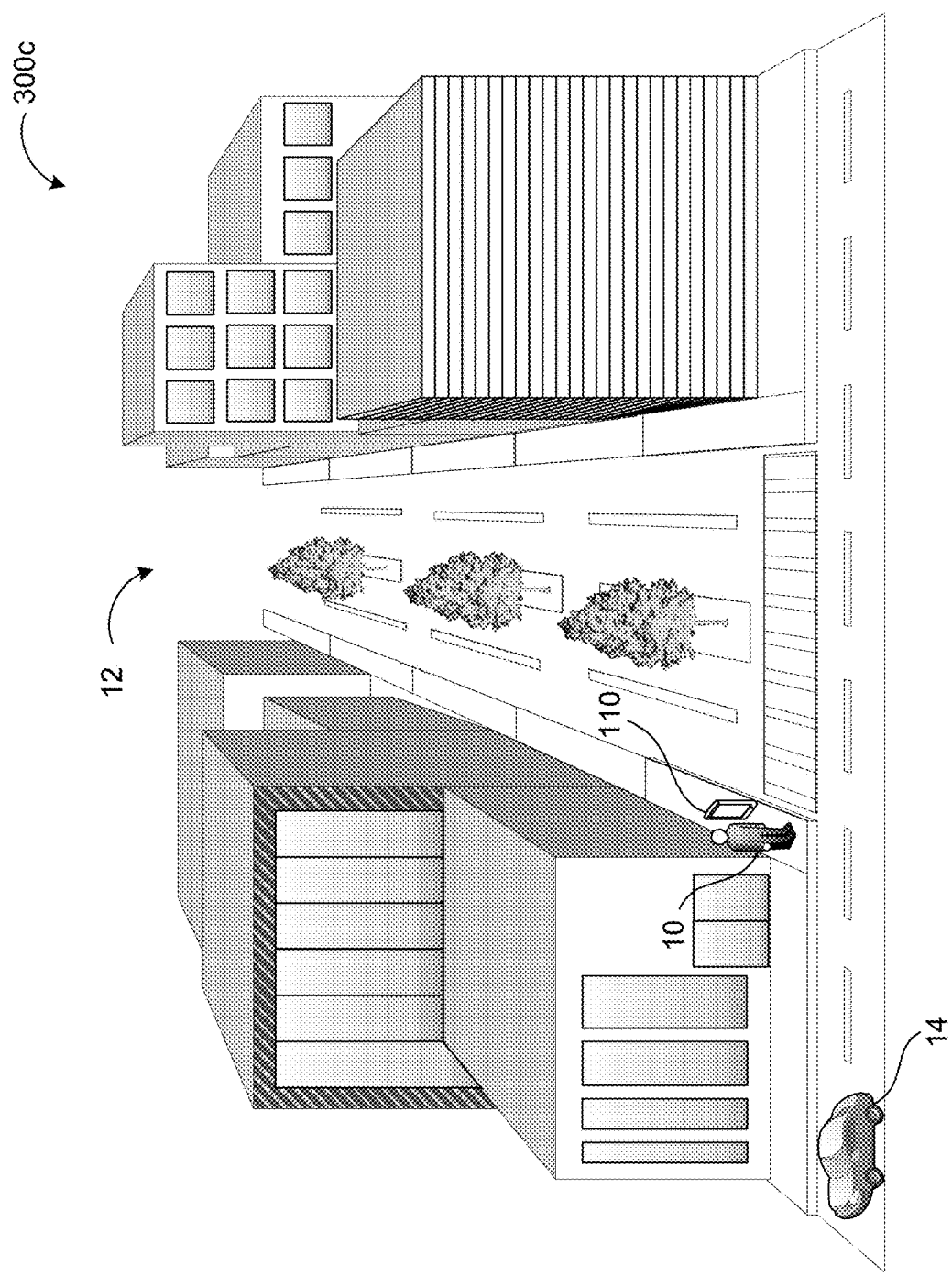
Figure 4A:
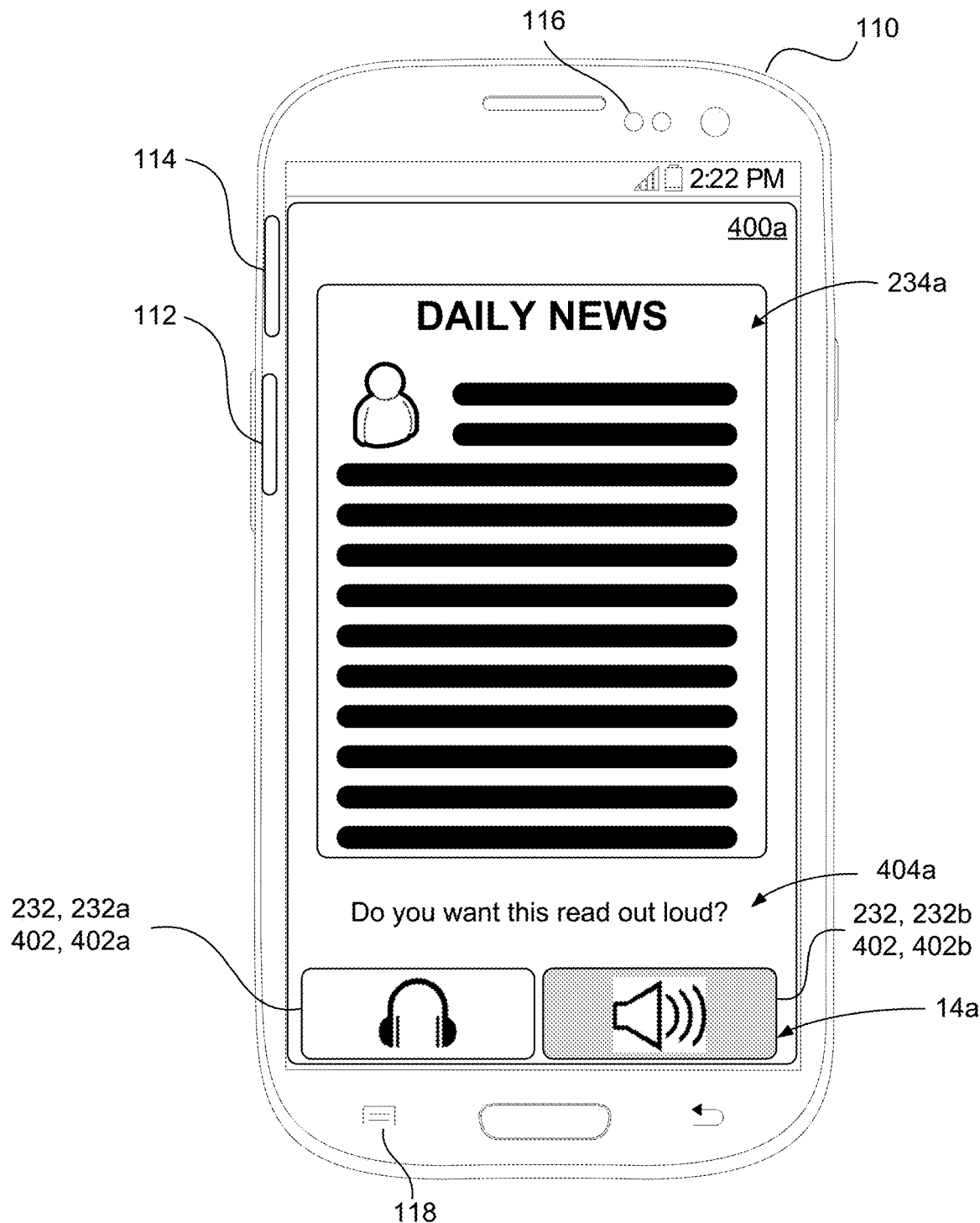
FIGS. 4A-C are schematic views of example displays 400a—c rendered on the screen of the user device to display assistance functions.
Figure 4B:
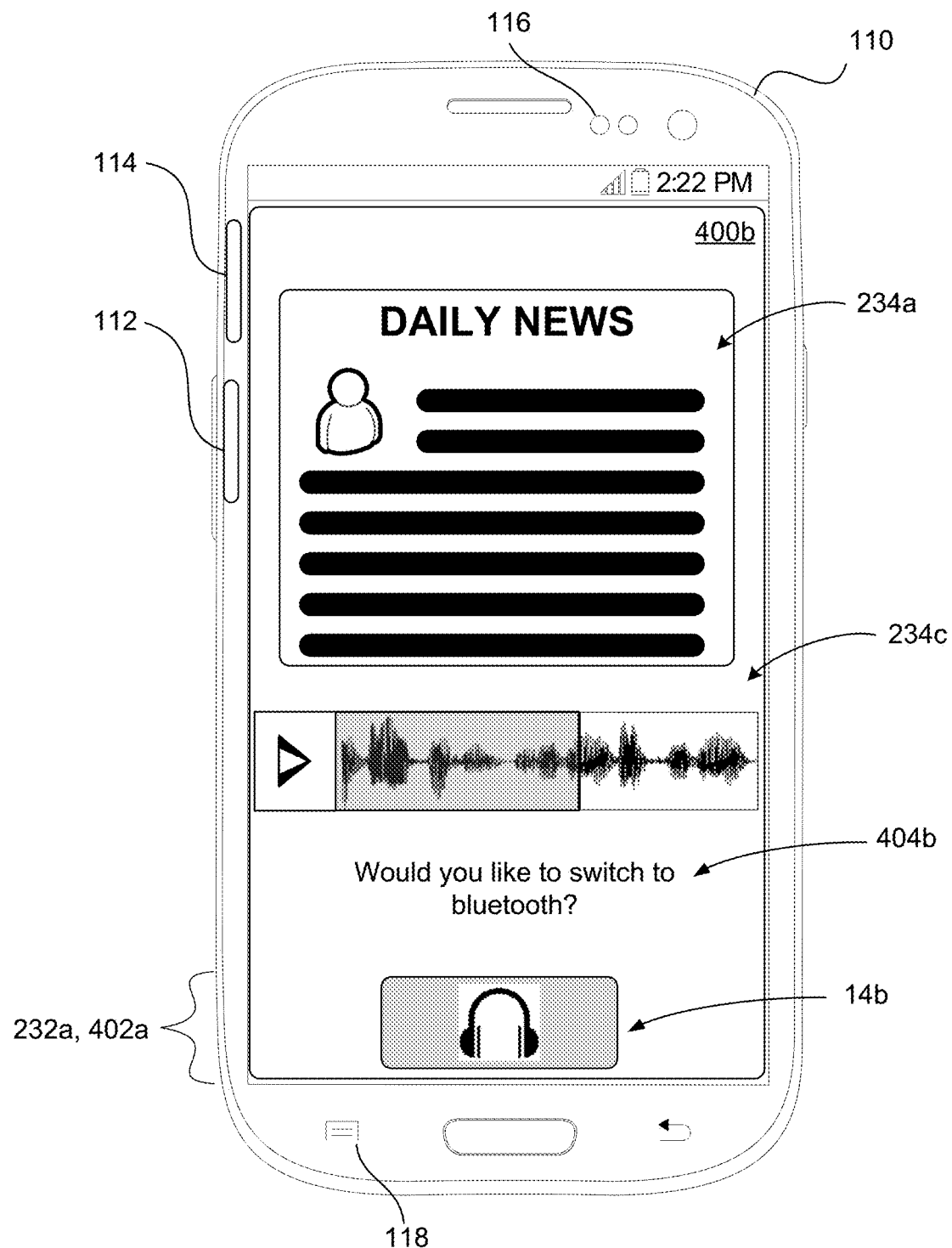
Figure 4C:
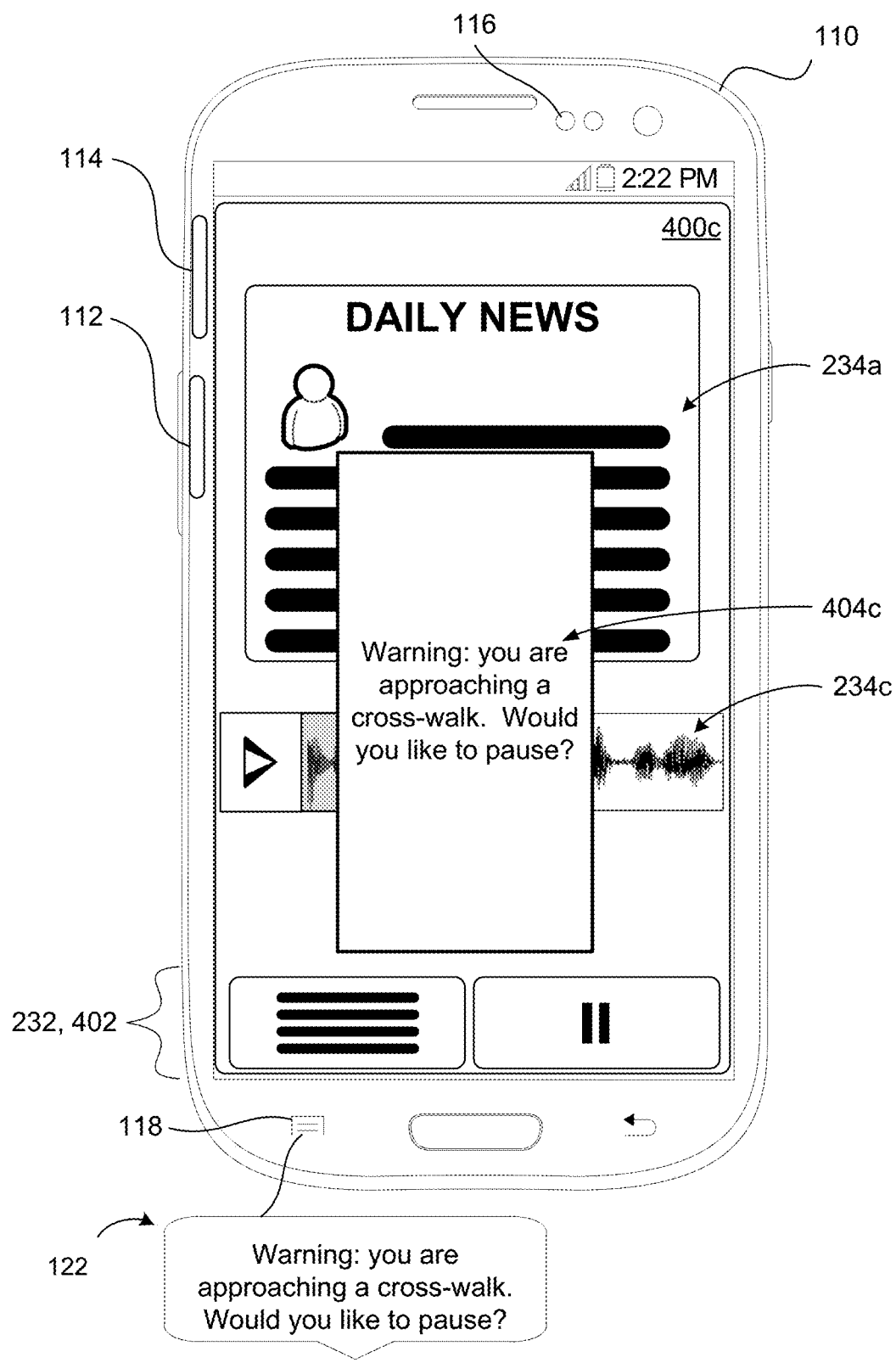

FIGS. 3A-3C show schematic views 300a—c of a user 10 with a user device 110 executing an assistant application 140 as the user 10 moves about an environment (e.g., urban environment 12). FIGS. 4A-4C show example GUIs 400a—c rendered on the screen of the user device 110 to display a respective set of presentation mode options 232 that compliment the current state 212 of the user 10 determined in FIGS. 3A-3C. As discussed above, each presentation mode option 232 may be rendered in the GUI 400 as a respective graphic 402 representing the corresponding presentation mode 234. As will become apparent in FIGS. 3A-4C, the presentation mode options 232 rendered in each of the GUIs 400a—c change based on the current state 212 of the user 10 as the user 10 moves about the environment 12.

Referring to FIGS. 3A and 4A, the user 10 is performing the current activity of walking along a street in the environment 12. Moreover, the user 10 is reading a news article rendered in the GUI 400a. As such, the user device 110 may be described as presenting the news article to the user 10 in a visual-based presentation mode 234a. For instance, the user 10 was previously standing still to read the news article such that the previous state 220 of the user 10 may have been characterized as stationary. As discussed with reference to FIGS. 1 and 2, the user device 110 may continuously (or at periodic intervals) obtain sensor data 152 captured by the sensor system 150 to determine a current state 212 of the user 10, whereby the current state 212 is associated with presentation mode options 232 available to the user 10. With reference to FIGS. 3A and 4A, the sensor data 152 may indicate that an external speaker 118 (i.e., Bluetooth headphones) is currently connected to the user device 110. Accordingly, the presentation modes 234 presented to the user 10 as presentation mode options 232 account for this headphone connectivity.

The sensor system 150 of the user device 110 may pass the sensor data 152 to the state determiner 210 of the presenter 202, whereby the state determiner 210 determines that the current state 212 of the user 10 is walking. The state determiner 210 may form this determination based on a changing location of the user 10 in the environment 12 (e.g., as indicated by locational/movement sensor data 152). After determining the current state 212 of the user 10, the mode suggestor 230 may determine the presentation mode options 232 associated with the current state 212 of the user 10 from the presentation modes 234 available on the user device 110. As noted above, the mode suggestor 230 may ignore the presentation modes 234 that are not relevant to the current state 212 of the user 10 when determining the presentation mode options 232 to present to the user 10.

After determining the presentation mode options 232 associated with the current state 212 of the user 10, the user device 110 generates (i.e., using the assistant application 140) the presentation mode options 232 for display on the GUI 400a of FIG. 4A. As shown in FIG. 4A, the user device 110 renders/displays, on the GUI 400a, a first graphical element 402, 402a for a first presentation mode option 232, 232a and a second graphical element 402, 402b for a second presentation mode option 232, 232b at the bottom of the screen. The two graphical elements 402a—b may inform the user 10 that two different presentation modes 234 are available for presenting the content (i.e., the news article).

In the example shown, the assistant application 140 of the user device 110 may further render/display a graphical element 404a representing text that asks the user 10, "Do you want this read out loud?" The presentation mode options 232 associated with the current state 212 of walking may include a first audio-based presentation option 232a corresponding to a first audio-based presentation mode 234b that dictates the news article using a connected external speaker 118 (e.g., headphones) and a second audio-based presentation option 232b corresponding to another second audio-based presentation mode 234c that dictates the news article using an internal speaker 118 of the user device 110. Here, the user 10 may provide a user input indication 14a indicating selection of the second audio-based presentation option 232b to use the internal speaker 118 of the user device 110 (e.g., by touching a graphical button in the GUI 400a that universally represents "speaker"). This selection then causes the user device 110 to initiate presentation of the news article in the second audio-based presentation mode 234c of dictation.

Referring to FIGS. 3B and 4B, the assistant application 140 of the user device 110 is dictating the news article to the user 10 while the current state 212 indicates the user 10 is walking in response to the user 10 providing the user input indication 14a indicating selection of the internal speaker 118 of the user device 110 displayed in the GUI 400a of FIG. 4A to cause the assistant application 140 to initiate the presentation of the second audio-based presentation mode 234c. As shown in FIG. 4B, the GUI 400b displays/renders the second audio-based presentation mode 234c in parallel with the visual-based presentation mode 234a displayed/rendered in the GUI 400a. Notably, the GUI 400b is displaying a graphic of a waveform to indicate that content is currently being audibly output in the second audio-based presentation mode 234c from an audio-output device. The graphic may further provide playback options, such as pause/play, as well as options to scan content forward/backward. In some implementations, initiating a presentation mode 234 ceases presentation of content in the prior presentation mode 234. For instance, presentation of the news article in the audio-based presentation mode 234 occurs while ceasing presentation of the visual-based presentation mode 234 rendered while the user 10 was stationary.

As shown in FIG. 3B, a vehicle 16 drives past the user 10 and honks 18 its horn. In the urban environment 12, this sudden loud noise may make it difficult for the user to hear the audio-based presentation mode 234 from the speaker 118 of the user device 110. The sensor system 150 may detect the honk 18 as sensor data 152 and provide the sensor data 152 to the presenter 202. The state determiner 210 of the presenter 202 may determine, based on the sensor data 152, that a current state 212 of the user 10 indicates the user 10 is walking in a noisy environment. The state determiner 210 may make its determination based a single environmental factor captured as sensor data 152 (e.g., the honk 18) or an aggregate of environmental factors captured as sensor data 152 (e.g., geographical location proximate to a crowded street in addition to the honk 18 of the vehicle 16). Moreover, when the vehicle 16 honks, the current sensor data 152 still indicates that the external speaker 118 (i.e., Bluetooth headphones) is connected to the user device 110.

After determining the current state 212 of the user 10, the mode suggestor 230 may determine the presentation mode options 232 associated with the current state 212 of the user 10 from the presentation modes 234 available on the user device 110. Notably, the presentation mode 234 of the internal speaker 118 of the user device 110 may be excluded from the presentation mode options 232, since that is the current presentation mode 234 rendered/displayed on the GUI 400b. As noted above, the mode suggestor 230 may also ignore the presentation modes 234 that are not relevant to the current state 212 of the user 10 when determining the presentation mode options 232 to present to the user 10.

After determining the presentation mode options 232 associated with the current state 212 of the user 10, the user device 110 generates (i.e., using the assistant application 140) the presentation mode option 232a for display on the GUI 400b of FIG. 4B. As shown in FIG. 4B, the user device 110 renders/displays, on the GUI 400b, the graphical element 402a of the presentation mode option 232a at the bottom of the screen. The graphical element 402a informs the user 10 that the presentation mode option 232a is available as an audio-based presentation mode 234b for presenting the content (i.e., the news article).

In the example shown, the assistant application 140 of the user device 110 further renders/displays a graphical element 404b representing text that asks the user 10, "Would you like to switch to Bluetooth?" The presentation mode option 232 associated with the current state 212 of walking in a noisy environment may include the first audio-based presentation mode option 232a with a corresponding first presentation mode 234b that dictates the news article using the connected external speaker 118 (e.g., headphones). Here, the user 10 may provide a user input indication 14b indicating selection of the connected external speaker 118 of the user device 110 (e.g., by touching a graphical button in the GUI 400b that universally represents "headphones") to cause the user device 110 to initiate presentation of the news article in the first audio-based presentation mode 234b of dictation to the connected external speaker 118.

Referring to FIGS. 3C and 4C, the assistant application 140 of the user device 110 is dictating the news article to the user 10 via the connected external speaker 118 while the current state 212 of the user 10 is walking in a busy environment in response to the user 10 providing the user input indication 14b indicating selection of the connected external speaker 118 of the user device 110 displayed in the GUI 400b of FIG. 4B to cause the assistant application 140 to initiate the presentation of the first audio-based presentation mode 234b. As shown in FIG. 4C, the GUI 400b displays/renders the first audio-based presentation mode 234b in parallel with the visual-based presentation mode 234a displayed/rendered in the GUI 400a.

As shown in the example, the user 10 is now walking towards a crosswalk. In the urban environment 12, this crosswalk is a potential hazard to the user 10 if the user 10 is not paying attention to the environment 12. The sensor system 150 may detect the user 10 is approaching the crosswalk from sensor data 152 and provide the sensor data 152 to the presenter 202. The state determiner 210 of the presenter 202 may determine, based on the sensor data 152, that a current state 212 of the user 10 indicates an approaching potential hazard. The state determiner 210 may make its determination based on the sensor data 152 indicating environmental factors such as a crowded street in addition to the crosswalk the user 10 is approaching. Additionally, the current sensor data 152 still indicates that the external speaker 118 (i.e., Bluetooth headphones) is connected to the user device 110.

After determining the current state 212 of the user 10, the mode suggestor 230 may determine the presentation mode options 232 associated with the current state 212 of the user 10 from the presentation modes 234 available on the user device 110. Notably, the first audio-based presentation mode 234b of the connected external speaker 118 of the user device 110 may be excluded from the presentation mode options 232, since that is the current presentation mode 234 rendered/displayed on the GUI 400c. As noted above, the mode suggestor 230 may also ignore the presentation modes 234 that are not relevant to the current state 212 of the user 10 when determining the presentation mode options 232 to present to the user 10.

After determining the presentation mode options 232 associated with the current state 212 of the user 10, the user device 110 generates (i.e., using the assistant application 140) the presentation mode options 232 for display on the GUI 400c of FIG. 4C. As shown in FIG. 4C, the user device 110 renders/displays, on the GUI 400c, the graphical elements 402 of the presentation mode options 232 at the bottom of the screen. The graphical elements 402 inform the user 10 that the presentation mode options 232 are available for presenting the content (i.e., the news article).

In the example shown, the assistant application 140 of the user device 110 further renders/displays a graphical element 404c representing a notification or warning to the user that says, "Warning: you are approaching a cross-walk. Would you like to pause?" The presentation mode options 232 associated with the current state 212 of approaching a crosswalk may include the graphical element 402 to pause the audio-based presentation mode 234, and the graphical element 402 to switch a visual-based presentation mode 234 for viewing the content at a later time. Additionally or alternatively, because the sensor data 152 indicates that an external speaker 118 is connected to the user device 110, the assistant application 140 may output, as synthesized speech 122, the warning to the user 10. In these examples, the user 10 may provide a user input indication 14 indicating selection of a presentation mode option 232 of the user device 110 by providing speech input to the user device 110. For instance, the speech input is a spoken utterance by the user 10 that is a user command to initiate presentation of the news article in a particular presentation mode 234. In other words, the user 10 may speak a command to select a graphical element 402 to cause the user device 110 to initiate presentation of the news article in a presentation mode 234 associated with the selected graphical element 402.

In some implementations, in response to providing the synthesized speech 122 to the user 10, the user device 110 (e.g., via the assistant application 140) may activate the microphone 116 of the user device 110 to capture the speech input from the user 10. In these implementations, the assistant application 140 of the user device 110 may be trained to detect via the microphone 116, but not recognize, specific warm words (e.g., "yes," "no," "video-based presentation mode," etc.) associated with the presentation mode options 232 without performing full speech recognition of the spoken utterance that includes the specific warm word. This would preserve privacy of the user 10 so that all unintended speech is not recorded while the microphone 116 is active, while also reducing the power/computing required to detect relevant warm words.

Figure 5:
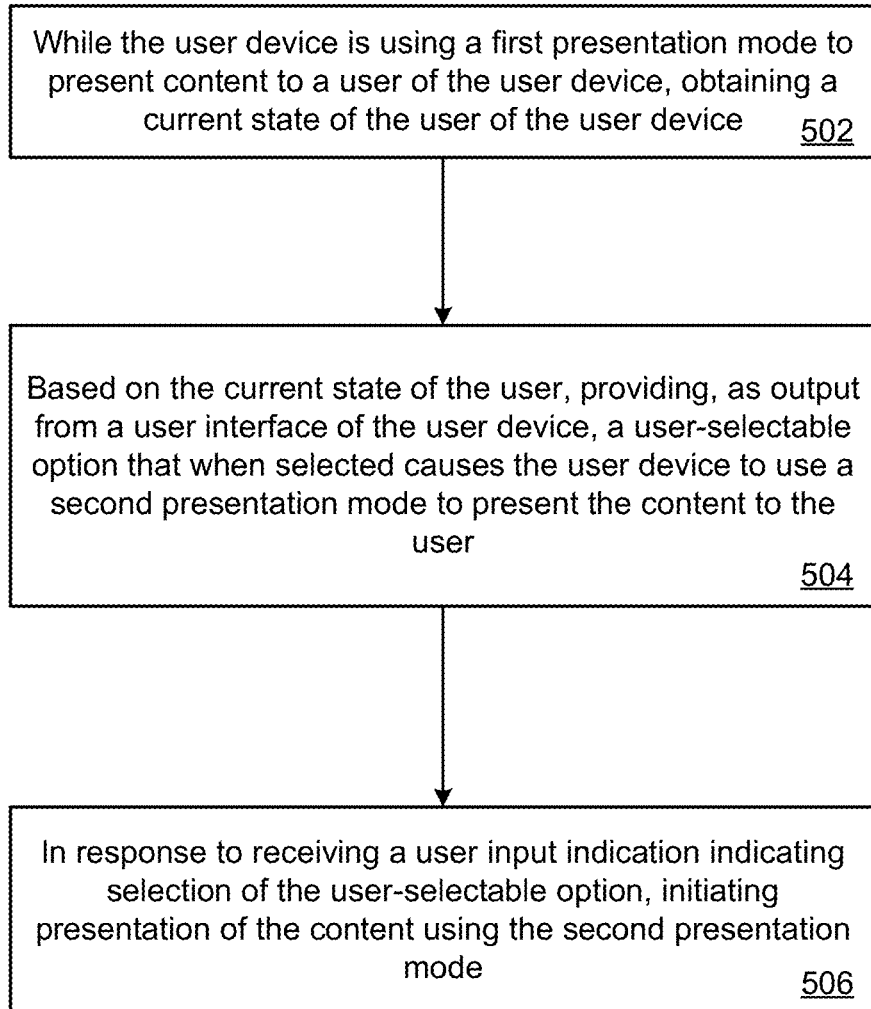
FIG. 5 is a flowchart of an example arrangement of operations for a method for triggering assistance functions of the user device.

FIG. 5 includes a flowchart of an example arrangement of operations for a method 500 of triggering assistance functions of a user device 110. At operation 502, the method 500 includes, while the user device 110 is using a first presentation mode to present content to a user 10 of the user device 110, obtaining a current state 212 of the user 10 of the user device 110. The method 500 further includes, at operation 504, based on the current state 212 of the user 10, providing, as output from a user interface 400 of the user device 110, a user-selectable option 402 that when selected causes the user device 110 to use a second presentation mode to present the content to the user 10. At operation 506, the method 500 further includes, in response to receiving a user input indication 14 indicating selection of the user-selectable option 402, initiating presentation of the content using the second presentation mode.

Figure 6:
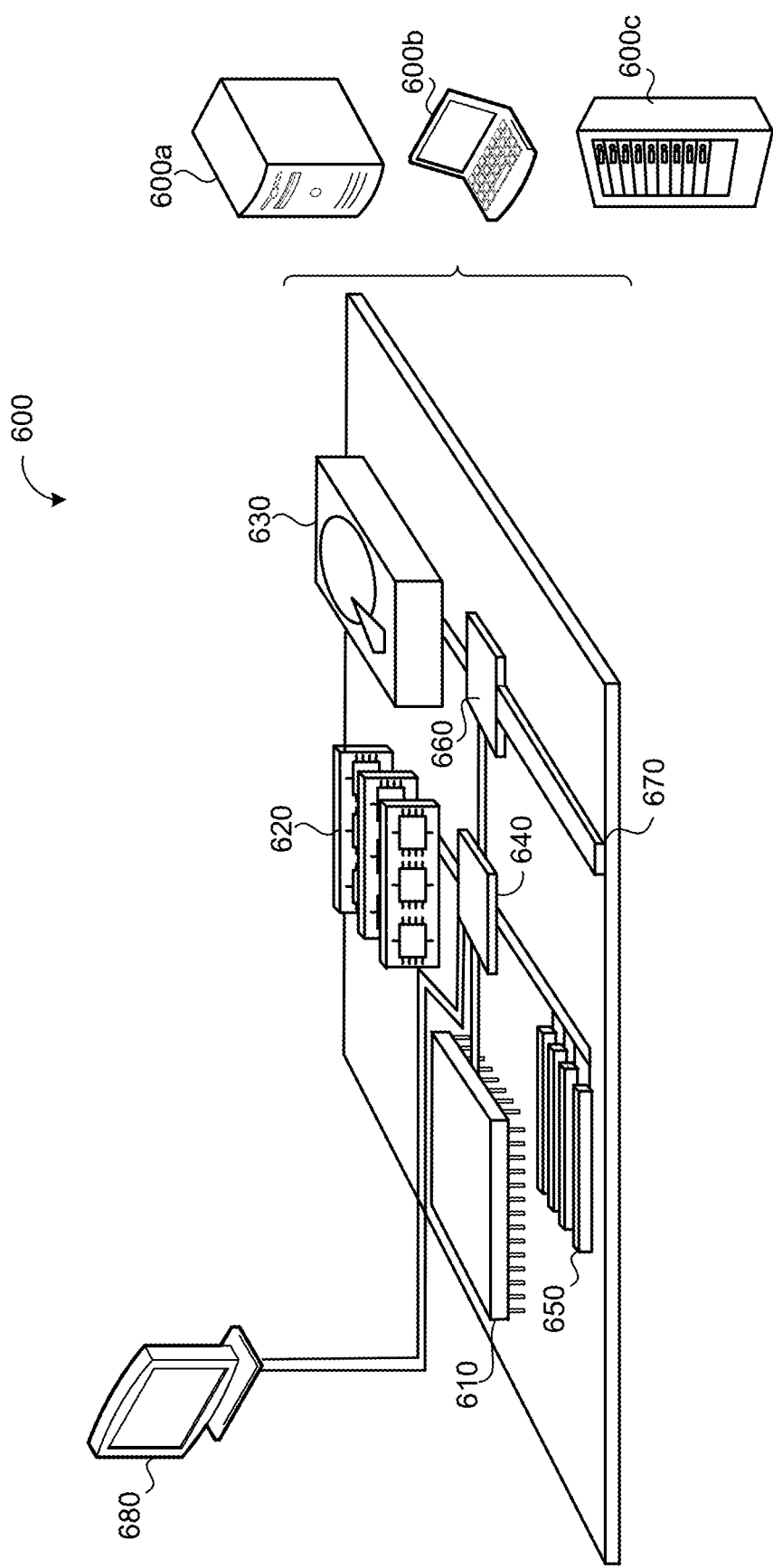
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware of a user device causes the data processing hardware to perform operations for triggering assistance functions on the user device, the operations comprising:
   while the user device is using a first presentation mode comprising a visual-based presentation mode to present content to a user of the user device:
      receiving sensor data captured by the user device, the sensor data conveying an orientation and proximity of the user device relative to a face of the user;
      obtaining a current state of the user of the user device based on the sensor data;
      determining that the current state of the user indicates that the user is:
         performing a current activity of reading the content presented to the user using the first presentation mode; and
         approaching a potential hazard to the user; and
      based on determining that the current state of the user indicates that the user is performing the current activity of reading, providing, as output from a user interface of the user device:
         a user-selectable option that when selected causes the user device to use a second presentation mode comprising an audio-based presentation mode to present the content to the user; and
         a warning to the user, the warning notifying the user of the potential hazard; and
   in response to receiving a user input indication indicating selection of the user-selectable option, continuing to present the content to the user of the user device by initiating presentation of the content using the second presentation mode and the first presentation mode in parallel.

2. The computer-implemented method of claim 1, wherein the sensor data comprises at least one of global positioning data, image data, noise data, accelerometer data, connection data indicating the user device is connected to another device, or noise/speech data.

3. The computer-implemented method of claim 1, wherein the current state of the user is also indicative of one or more other current activities the user is performing.

4. The computer-implemented method of claim 3, wherein the one or more other current activities comprise at least one of walking, driving, commuting, or talking.

5. The computer-implemented method of claim 1, wherein providing the user-selectable option as output from the user interface is further based on a current location of the user device.

6. The computer-implemented method of claim 1, wherein providing the user-selectable option as output from the user interface is further based on a type of the content and/or a software application running on the user device that is providing the content.

7. The computer-implemented method of claim 1, wherein providing the user-selectable option as output from the user interface comprises displaying, via the user interface, the user-selectable option as a graphical element on a screen of the user device, the graphical element informing the user that the second presentation mode is available for presenting the content.

8. The computer-implemented method of claim 7, wherein receiving the user input indication comprises receiving one of:
- a touch input on the screen that selects the displayed graphical element;
- receiving a stylus input on the screen that selects the displayed graphical element;
- receiving a gesture input indicating selection of the displayed graphical element;
- receiving a gaze input indicating selection of the displayed graphical element; or
- receiving a speech input indicating selection of the displayed graphical element.

9. The computer-implemented method of claim 1, wherein providing the user-selectable option as output from the user interface comprises providing, via the user interface, the user-selectable option as an audible output from a speaker in communication with the user device, the audible output informing the user that the second presentation mode is available for presenting the content.

10. The computer-implemented method of claim 1, wherein receiving the user input indication indicating selection of the user-selectable option comprises receiving a speech input from the user indicating a user command to select the user-selectable option.

11. The computer-implemented method of claim 10, wherein the operations further comprise, in response to providing the user-selectable option as output from the user interface, activating a microphone to capture the speech input from the user.

12. A system comprising:
- data processing hardware; and
- memory hardware in communication with the data processing hardware, the memory hardware storing instructions that when executed on the data processing hardware cause the data processing hardware to perform operations comprising:
  - while a user device is using a first presentation mode comprising a visual-based presentation mode to present content to a user of the user device:
    - receiving sensor data captured by the user device, the sensor data conveying an orientation and proximity of the user device relative to a face of the user;
    - obtaining a current state of the user of the user device based on the sensor data;
    - determining that the current state of the user indicates that the user is:
      - performing a current activity of reading the content presented to the user using the first presentation mode; and
      - approaching a potential hazard to the user; and
    - based on determining that the current state of the user indicates that the user is performing the current activity of reading, providing, as output from a user interface of the user device:
      - a user-selectable option that when selected causes the user device to use a second presentation mode comprising an audio-based presentation mode to present the content to the user; and
      - a warning to the user, the warning notifying the user of the potential hazard; and
  - in response to receiving a user input indication indicating selection of the user-selectable option, continuing to present the content to the user of the user device by initiating presentation of the content using the second presentation mode and the first presentation mode in parallel.

13. The system of claim 12, wherein the sensor data comprises at least one of global positioning data, image data, noise data, accelerometer data, connection data indicating the user device is connected to another device, or noise/speech data.

14. The system of claim 12, wherein the current state of the user is also indicative of one or more other current activities the user is performing.

15. The system of claim 14, wherein the one or more other current activities comprise at least one of walking, driving, commuting, or talking.

16. The system of claim 12, wherein providing the user-selectable option as output from the user interface is further based on a current location of the user device.

17. The system of claim 12, wherein providing the user-selectable option as output from the user interface is further based on a type of the content and/or a software application running on the user device that is providing the content.

18. The system of claim 12, wherein providing the user-selectable option as output from the user interface comprises displaying, via the user interface, the user-selectable option as a graphical element on a screen of the user device, the graphical element informing the user that the second presentation mode is available for presenting the content.

19. The system of claim 18, wherein receiving the user input indication comprises receiving one of:
- a touch input on the screen that selects the displayed graphical element;
- receiving a stylus input on the screen that selects the displayed graphical element;
- receiving a gesture input indicating selection of the displayed graphical element;
- receiving a gaze input indicating selection of the displayed graphical element; or
- receiving a speech input indicating selection of the displayed graphical element.

20. The system of claim 12, wherein providing the user-selectable option as output from the user interface comprises providing, via the user interface, the user-selectable option as an audible output from a speaker in communication with the user device, the audible output informing the user that the second presentation mode is available for presenting the content.

21. The system of claim 12, wherein receiving the user input indication indicating selection of the user-selectable option comprises receiving a speech input from the user indicating a user command to select the user-selectable option.

22. The system of claim 21, wherein the operations further comprise, in response to providing the user-selectable option as output from the user interface, activating a microphone to capture the speech input from the user.

* * * * *